3,150,193
PROCESS FOR THE PURIFICATION OF
ALKANOLS
Jerry A. Acciarri and Donald R. Napier, Ponca City, Okla., assignors to Continental Oil Company, Ponca City, Okla., a corporation of Delaware
No Drawing. Filed Jan. 14, 1960, Ser. No. 2,325
14 Claims. (Cl. 260—643)

This invention relates to a process for the separation and recovery of alkanols from admixture with alkanes and alkenes by extractive crystallization with nitroalkanes.

In the preparation of alkanols, for example, by the oxidation of aluminum trialkyls followed by hydrolysis of the alkoxy product, compounds are produced which cannot be separated economically by simple fractionation alone because of the proximity of the boiling points, particularly of the higher molecular weight components.

It is an object of this invention to provide an improved process for the separation of alkanols from complex admixtures comprising alkanes and alkenes.

Another object of this invention is to provide an improved process for separating C-12 and higher alcohols from admixture with n-alkanes and 1-alkenes of similar boiling points.

Still another object of this invention is an improved process for the recovery of alcohols from reaction product obtained by the oxidation and hydrolysis of trialkyl-aluminum compounds.

These and other objects of the invention will become more readily apparent from the following detailed description and discussion.

The foregoing objects are achieved broadly by subjecting a mixture comprising alkanols, alkanes and alkenes to extractive crystallization with a nitroalkene and recovering an alcohol product.

In one aspect of the invention the nitroalkane is added to said mixture, thereafter the temperature of the mixture is reduced until alkanols crystallize from solution, the crystals are separated by filtration and treated to remove residual nitroalkane and olefin.

In another aspect of the invention said mixture is reduced in temperature until alkanols crystallize from solution, the nitroalkane is added to liquid-crystal mixture and the mixture agitated, alkanol crystals are separated by filtration and the separated crystals are treated to remove residual nitroalkanes and olefins.

In each of the specific embodiments above, treating of the crystals can be either by stripping or by water washing.

The process of this invention is broadly applicable to the separation and recovery of alkanols from admixtures comprising alkanes and alkenes. The process finds particular application in the treatment of admixtures of similar boiling points which cannot be economically separated by distillation. The invention finds special use in the separation and recovery of alkanols prepared from the oxidation and subsequent hydrolysis of complex metal alkyls, e.g., aluminum trialkyls, as described in United States Patent 2,892,858 to Karl Ziegler. Briefly, in this process a simple metal alkyl, such as aluminum triethyl, is grown (reacted) continuously with an olefin, such as ethylene, whereby complex metal alkyls are formed. The complex metal alkyls are then oxidized with oxygen (air) to form metal alkoxy compounds. Hydrolysis of the alkoxy compounds provides a mixture of alcohols, olefins, paraffins and minor amounts of oxygenated compounds, such as aldehydes. The alcohols which are formed in this reaction have a composition following a Poisson distribution and ranging from ethanol to 1-tetracosanol.

The lower molecular weight alcohols up through those containing about 10 carbon atoms are readily separable by distillation. However, the higher molecular weight compounds containing from about 12 to about 22 carbon atoms and including alkanols and 1-alkenes and n-alkanes are sufficiently close in boiling points that their separation by distillation is impractical. The boiling points of a representatve mixture are listed below:

| Compound | Pressure, mm. Hg | Temperature, °C. |
|---|---|---|
| 1-tetradecanol | 5.0 | 140 |
| n-hexadecane | 5.0 | 135 |
| 1-hexadecene | 5.0 | 132 |
| 1-hexadecanol | 5.0 | 158 |
| n-octadecane | 5.0 | 153 |
| 1-octadecene | 5.0 | 157 |
| 1-octadecanol | 5.0 | 185 |
| n-eicosane | 5.0 | 181 |
| 1-eicosene | 5.0 | 180 |

In carrying out the invention in one embodiment, for example for the recovery of alkanols from an admixture such as that listed above, a nitroalkane such as nitroethane is first added to said mixture. The mixture is thereafter reduced in temperature until alkanols crystallize from solution. The crystals are separated from the liquid and are treated to remove residual nitroethane and other components, principally olefins. The reaction conditions employed in this process can vary substantially depending on the particular components in the mixture to be treated, the specific nitroalkane which is employed in effecting the separation and on the particular manner in which the steps of the process are carried out. For example, when separating alkanols containing from about 12 to about 24 carbon atoms utilizing nitroethane, crystallization of the alkanols can be effected at about 35 to about 55° F. When utilizing other nitroalkanes either higher or lower temperatures are required, depending on the particular extracting agent employed. Thus nitropropane requires lower temperatures than nitroethane and crystallization of the alkanols can be effected at higher temperatures with nitromethane. Preferably the nitroalkane and alkanol-alkane-alkene mixture are agitated prior to crystallization and if necessary can be heated to provide a single phase during this operation. The alcohol crystals can be separated from the mixture by any suitable means, for example, filtration, centrifugation, etc. Because of the viscosity of the mixture it is desirable that this separation be effected under a vacuum, preferably in the order of about 100 to about 600 millimeters of mercury. The alcohol crystals, while substantially richer in alcohol content than the original mixture, contain residual amounts of nitroalkane and other components, principally olefins. Crystals can be further purified by a subsequent treatment which can include either stripping or water washing. In view of the boiling points of the materials employed further treatment by stripping is desirably carried out under a low vacuum, usually in the order of between about 5 and about 100 millimeters of mercury. Although not usually required an extraneous stripping gas which is inert in the system, such as nitrogen, can be used if desired.

The extraction agent employed in the process comprises the lower nitroalkanes, preferably nitromethane, nitroethane and nitropropane. These materials can be used singularly or in combination. The particular extractive agent employed depends on the mixture which is to be treated. As pointed out previously the conditions of temperature, pressure, etc., which are provided depend on the composition of the mixture of alcohols, alkanes and alkenes and also on the particular extraction agent which is used. The nitroalkane is used ordinarily in an amount varying from between about 0.25 and about 20 grams per gram of alcohol-alkene-alkane mixture and preferably between about 1 and about 5 grams per gram.

The metal alkyls from which the alkanols are prepared can contain various metals, particularly those in Groups I, II and III of the Periodic Table, such as sodium, boron, magnesium, aluminum, lithium and the like. Of the metal alkyls, however, the aluminum trialkyls are preferred and are those generally employed.

In another embodiment of the invention involving a somewhat different order of steps, a mixture of alkanols, alkanes and alkenes is first subjected to a temperature reduction sufficient to provide crystallization of alkanols from solution. Following this nitroalkane is added to the solids-liquid mixture followed by agitation, after which the liquids and solids are separated by filtration and either stripped or water washed to remove residual impurities from the alcohol crystals. The conditions employed in this process, for example, temperatures, pressures, quantities of nitroalkane, etc., are substantially the same as those used in the preceding embodiment of the invention.

Both embodiments of the invention can be practiced to recover substantially pure alcohols from a complex mixture. The degree of purity of the product is of course dependent both on the conditions employed in the process and on the number of stages of separation which are carried out. The latter are readily determined by those skilled in the art from a consideration of the selectivity values obtained in a single stage separation, selectivity being defined as set forth in Tables I and II hereafter presented. It is contemplated that in a multi-stage separation recycle of products obtained from the various stages can be practiced in a conventional manner and also heat exchange between the various streams for the conservation and maximum utilization of energy.

While in the preferred embodiment the invention is directed to the treatment of mixtures containing n-alkanols, n-alkanes and 1-alkenes, it is within the scope of the invention to separate more complex materials, such as branched alkanols and alkanes and internally unsaturated olefins, and various combinations thereof.

The following examples are presented in illustration of the invention:

EXAMPLE 1

A 241.1 gram alcohol-olefin mixture was mixed with 487 grams of nitroethane. (The composition of the original alcohol-olefin mixture was as follows: 0.9 weight percent 1-dodecanol, 59.3 weight percent 1-tetradecanol, 32.4 weight percent 1-hexadecanol, 2.8 weight percent 1-hexadecene, and 4.6 weight percent 1-octadecene.) The alcohol-solvent mixture was heated to 122° F., where it existed as one phase, and agitated for 10 minutes. The resulting mixture was cooled to 42° F. whereby the alcohols crystallized out of solution. The liquid-solids were separated by filtration whereby 436.1 grams of total alcohol rich layer and 292.0 grams of nitroethane rich layer was recovered. The alcohol rich layer was stripped of 209.1 grams of nitroethane under 7 mm. Hg and 110–120° F.

EXAMPLE 2

A similar procedure, as Example 1, was used with the exception that a 5/1 weight ratio of nitroethane to alcohol-olefin mixture was used.

EXAMPLE 3

A similar procedure and starting mixture, as Example 1, was used with the exception that at 2/1 weight ratio of nitroethane to alcohol-olefin mixture was used; and the alcohol rich layer filter cake was washed with six times its weight of 40° F. water.

EXAMPLE 4

A similar procedure as Example 1 was used, with the exception that a 1/1 weight ratio of nitroethane to alcohol-olefin mixture was used. The results obtained in each of the Examples 1–4 are presented in Table I.

EXAMPLE 5

A 248.4 gram mixture of alcohol-olefin and 1242 grams of nitroethane were mixed for 10 minutes at 42° F. The composition of the alcohol-olefin starting mixture was as follows: 1.1 weight percent 1-dodecanol, 57.3 weight percent 1-tetradecanol, 31.3 weight percent 1-hexadecanol, 3.8 weight percent 1-hexadecene, 6.5 weight percent 1-octadecene. The liquid-solid were then separated by filtration into a 1226.4 grams nitroethane rich layer and a 264.0 grams of alcohol rich layer. The nitroethane (38.0 grams) was stripped from the alcohol rich layer at 8 mm. Hg absolute pressure and 100–120° F.

EXAMPLE 6

A similar procedure as in Example 5 was used.

EXAMPLE 7

A similar procedure, as in Example 5, was used with the exception that a 2/1 weight ratio of nitroethane alcohol-olefin mixture was used.

EXAMPLE 8

A similar procedure, as in Example 5, was used with the exception that a 10/1 weight ratio of nitroethane to alcohol-olefin mixture was used.

EXAMPLE 9

A similar procedure, as in Example 8, was used with the exception that the alcohol mixture composition was

*Table I*

| Example No. | Weight Ratio, Nitroethane/Alcohol | Mixing Temp., °C. | Crystallization Temp., °C. | Weight Percent Original Impurities Removed From Alcohols | | Weight Percent Original Alcohol Recovered as Product | | | Selectivity | Remarks |
|---|---|---|---|---|---|---|---|---|---|---|
| | | | | 1-Hexadecene | 1-Octadecene | $C_{12}OH$ | $C_{14}OH$ | $C_{16}OH$ | | |
| 1 | 2/1 | 50 | 5 | 35.2 | 17.9 | 68.2 | 96.0 | 94.0 | 1.3 | |
| 2 | 5/1 | 50 | 5 | 49.1 | 26.3 | 100.0 | 90.0 | 100.0 | 1.5 | |
| 3 | 2/1 | 50 | 5 | 45.0 | 31.0 | 48.3 | 97.6 | 95.4 | 1.5 | (Alcohol crystals washed with 6 volumes of water at 5° C.) |
| 4 | 1/1 | 50 | 5 | 16.2 | 11.3 | 59.5 | 100.0 | 100.0 | 1.2 | |

Definition of Selectivity (β):

$$\frac{\text{Wt. percent alcohol in final product}}{\text{Wt. percent impurities in final product}} = (\beta)^n \left( \frac{\text{Wt. percent alcohol in initial mixture}}{\text{Wt. percent impurities in initial mixture}} \right)$$

where n=Number contacting stages.

as follows: 0.97 weight percent 1-dodecanol, 41.99 weight percent 1-tetradecanol, 28.52 weight percent 1-hexadecanol, 13.47 weight percent 1-octadecanol, 2.79 weight percent 1-hexadecene, 5.83 weight percent 1-octadecene, 3.52 weight percent n-eicosane and 2.91 weight percent n-docosane.

The results obtained in each of the Examples 5–9 are presented in Table II.

Having thus described the invention by providing specific examples thereof, it is to be understood that no undue limitations or restrictions are to be drawn by reason thereof and that many variations and modifications are within the scope of the invention.

Table II

| Example No. | Weight Ratio, Nitroethane/Alcohol | Temp., °C. | Weight Percent Original Impurities Removed | | | | Weight Percent of Original Alcohol Recovered as Product | | | | Selectivity |
|---|---|---|---|---|---|---|---|---|---|---|---|
| | | | 1-Hexadecene | 1-Octadecene | n-eicosane | n-docosane | $C_{12}OH$ | $C_{14}OH$ | $C_{16}OH$ | $C_{18}OH$ | |
| 5 | 5/1 | 5 | 21.0 | 31.4 | | | 92.0 | 93.7 | 92.5 | | 1.3 |
| 6 | 5/1 | 5 | 20.0 | 25.6 | | | 100.0 | 99.2 | 97.0 | | 1.2 |
| 7 | 2/1 | 5 | 10.0 | 22.0 | | | 100.0 | 99.6 | 97.1 | | 1.2 |
| 8 | 10/1 | 5 | 27.9 | 37.8 | | | 78.6 | 96.8 | 100.0 | | 1.4 |
| 9 | 10/1 | 5 | 10.7 | 39.2 | 37.8 | 3.3 | 62.5 | 83.2 | 94.9 | 100.0 | 1.3 |

Definition of Selectivity ($\beta$):

$$\frac{\text{Wt. percent alcohol in final product}}{\text{Wt. percent impurities in final product}} = (\beta)^n \left(\frac{\text{Wt. percent alcohol in initial mixture}}{\text{Wt. percent impurities in initial mixture}}\right)$$

where n = Number contacting stages

It is noted from the examples that extractive fractionation with nitroethane, even in a single stage, provides an alcohol product of substantially improved purity.

We claim:

1. A process for the separation of alkanols containing from about 12 to about 24 carbon atoms from a liquid mixture consisting essentially of said alkanols and alkanes and mono-olefins of similar boiling points which comprises adjusting the temperature of said mixture to within the range from about 35 to about 55° F. until alkanols crystallize from solution, thereafter adding to said mixture containing crystals from about 0.25 to about 20 parts of nitroethane per part of said mixture, subjecting the mixture containing crystals and nitroethane to agitation, separating said crystals and washing the separated crystals with water to remove residual nitroethane and mono-olefins.

2. A process for the separation of alkanols from a liquid mixture obtained from the oxidation and subsequent hydrolysis of complex aluminumtrialkyls, said mixture consisting essentially of 1-docecanol, 1-tetradecanol, 1-hexadecanol, 1-hexadecene and 1-octadecene which comprises adding to said mixture from about 0.25 to about 20 parts of nitroethane per part of said mixture, subjecting the mixture to agitation, thereafter reducing the temperature of said mixture to within the range from about 35 to about 55° F. until alkanols crystallize from solution, separating said crystals by vacuum filtration and stripping said crystals to remove residual nitroethane and alkenes.

3. A process for the separation of alkanols from a mixture obtained from the oxidation and subsequent hydrolysis of complex aluminumtrialkyls, said mixture consisting essentially of 1-docecanol, 1-tetradecanol, 1-hexadecanol, 1-octadecanol, 1-hexadecene, 1-octadecene, n-eicosane and n-docosane which comprises adding to said mixture from about 1 to about 5 parts of nitroethane per part of said mixture, agitating the mixture and heating to provide a single phase, thereafter adjusting the temperature of said mixture to within the range from about 35 to about 55° F. until alkanols crystallize from solution, separating said crystals by vacuum filtration and stripping said crystals under vacuum to remove residual nitroethane and alkenes.

4. The process for the separation of alkanols from a liquid mixture obtained from the oxidation and subsequent hydrolysis of complex aluminumtrialkyls, said mixture consisting essentially of 1-docecanol, 1-tetradecanol, 1-hexadecanol, 1-hexadecene and 1-octadecene which comprises adding to said mixture from about 1 to about 5 parts of nitroethane per part of said mixture, agitating the mixture, thereafter adjusting the temperature of said mixture to within the range from about 35 to about 55° F. until alkanols crystallize from solution, separating said crystals by vacuum filtration and washing said crystals with water to remove residual nitroethane and alkenes.

5. A process for the separation of alkanols from a mixture obtained from the oxidation and subsequent hydrolysis of complex aluminumtrialkyls, said mixture consisting essentially of 1-docecanol, 1-tetradecanol, 1-hexadecanol, 1-octadecanol, 1-hexadecene, 1-octadecene, n-eicosane and n-docosane which comprises adding nitroethane to said mixture in an amount of from about 0.25 gram of the nitroethane per gram of the mixture to about 20 grams of nitroethane per gram of the mixture, agitating the resulting mixture and heating to provide a single phase, thereafter reducing the temperature of said resulting mixture to within the range from about 35 to about 55° F. until alkanols crystallize from solution, separating said crystals from the resulting mixture by vacuum filtration and washing said crystals with water to remove residual nitroethane and alkenes.

6. A process for the separation of alkanols from a liquid mixture obtained from the oxidation and subsequent hydrolysis of complex aluminumtrialkyls, said mixture consisting essentially of 1-docecanol, 1-tetradecanol, 1-hexadecanol, 1-hexadecene and 1-octadecene which comprises adjusting the temperature of said mixture to within the range from about 35 to about 55° F. until alkanols crystallize from solution, thereafter adding to said mixture from about 1 to about 5 parts of nitroethane per part of said mixture containing crystals subjecting the mixture containing crystals and nitroethane to agitation, separating said crystals by filtration and stripping said crystals to remove residual nitroethane and alkenes.

7. A process for the separation of alkanols containing from about 12 to about 24 carbon atoms from a liquid mixture consisting essentially of said alkanols and alkanes and mono-olefins of similar boiling points which comprises adding to said mixture from about 0.25 to about 20 parts by weight of a lower nitroalkane having up to three carbon atoms per molecule per part by weight of said mixture, subjecting the resulting mixture to agitation, thereafter reducing the temperature of said resulting mixture to within the range from about 35 to about 55° F. until alkanols crystallize from solution, separating said crystals from the resulting mixture and stripping the separated crystals to remove residual nitroalkane and alkenes.

8. The process of claim 7 in which said mixture is heated prior to crystallization to provide a single liquid phase.

9. A process for the separation of alkanols containing from about 12 to about 24 carbon atoms from a mixture consisting essentially of said alkanols and alkanes and mono-olefins of similar boiling points which comprises adding to said mixture from about 1 to about 5 parts by weight of nitroethane per part by weight of said mixture, agitating the resulting mixture and heating to provide a single phase, thereafter reducing the temperature of said resulting mixture to within the range from about 35 to about 55° F. until alkanols crystallize from solution, separating said crystals from the resutling mixture by vacuum filtration and stripping the separated crystals under vacuum to remove residual nitroethane and alkenes.

10. A process for the separation of alkanols containing from about 12 to about 24 carbon atoms from a liquid mixture consisting essentially of said alkanols and alkanes and mono-olefins of similar boiling points which comprises adding to said mixture from about 0.25 to about 20 parts by weight of nitroethane per part by weight of said mixture, thereafter reducing the temperature of the resulting mixture to within the range from about 35 to about 55° F. until alkanols crystallize from solution, separating said crystals from the resulting mixture and washing the separated crystals with water to remove residual nitroethane and mono-olefins.

11. The process of claim 10 in which said mixture is heated prior to crystallization to provide a liquid single phase.

12. A process for the separation of alkanols containing from about 12 to about 24 carbon atoms from a mixture consisting essentially of said alkanols and alkanes and mono-olefins of similar boiling points which comprises adding to said mixture from about 1 to about 5 parts by weight of nitroethane per part by weight of said mixture, agitating the resulting mixture and heating to provide a single phase, thereafter reducing the temperature of said resulting mixture to within the range from about 35 to about 55° F. until alkanols crystallize from solution, separating said crystals from the resulting mixture by vacuum filtration and washing the separated crystals with water to remove residual nitroethane and mono-olefins.

13. A process for the separation of alkanols containing from about 12 to about 24 carbon atoms from a liquid mixture consisting essentially of said alkanols and alkanes and mono-olefins of similar boiling points which comprises adjusting the temperature of said mixture to within the range from about 35 to about 55° F. until alkanols crystallize from solution, thereafter adding to said mixture from about 0.25 to about 20 parts by weight of nitroethane per part by weight of said mixture, subjecting the resulting mixture containing crystals and nitroethane to agitation, separating said crystals from the resulting mixture and stripping the separated crystals to remove residual nitroethane and mono-olefins.

14. A process for the separation of alkanols from a liquid mixture consisting essentially of said alkanols having from about 12 to about 24 carbon atoms, n-alkanes and mono-olefins which comprises adjusting the temperature of the liquid mixture until the alkanol crystallize, adding to the mixture from about 0.25 to about 20 parts by weight of a lower nitroalkane per part by weight of said mixture and separating the alkanol crystals from the resulting mixture.

References Cited in the file of this patent

UNITED STATES PATENTS

| | | |
|---|---|---|
| 2,113,960 | Grote et al. | Apr. 12, 1938 |
| 2,479,041 | Elgin | Aug. 16, 1949 |
| 2,629,686 | Grosser | Feb. 24, 1953 |
| 2,700,049 | Rottig | Jan. 18, 1955 |

OTHER REFERENCES

Scheflan et al.: "The Handbook of Solvents," D. Van Nostrand Company Inc., New York (1953), page 558. (Copy in Library.)

Ashley: Fette, Seifen, Anstrichmittel, 58, 535–8 (1956). (Copy in Scientific Lib.)